United States Patent
Zhang et al.

(10) Patent No.: US 11,760,635 B2
(45) Date of Patent: Sep. 19, 2023

(54) SYSTEM AND METHOD FOR PREPARING CARBON NANOFIBER AND HYDROGEN THROUGH CONTINUOUS MICROWAVE PYROLYSIS

(71) Applicant: SOUTHEAST UNIVERSITY, Nanjing (CN)

(72) Inventors: Huiyan Zhang, Nanjing (CN); YIhan Wang, Nanjing (CN); Xiaodi Li, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 18/010,383

(22) PCT Filed: Dec. 20, 2021

(86) PCT No.: PCT/CN2021/139450
§ 371 (c)(1),
(2) Date: Dec. 14, 2022

(87) PCT Pub. No.: WO2022/257413
PCT Pub. Date: Dec. 15, 2022

(65) Prior Publication Data
US 2023/0192490 A1    Jun. 22, 2023

(30) Foreign Application Priority Data
Jun. 7, 2021   (CN) .......................... 202110634200.2

(51) Int. Cl.
*C01B 32/15* (2017.01)
*B01J 19/12* (2006.01)
(Continued)

(52) U.S. Cl.
CPC ............. *C01B 32/05* (2017.08); *B01J 19/126* (2013.01); *C01B 3/26* (2013.01);
(Continued)

(58) Field of Classification Search
CPC ......... C01B 32/15; C01B 3/26; C01B 32/158; C01B 32/159; C01B 32/16; C01B 32/162;
(Continued)

(56) References Cited

U.S. PATENT DOCUMENTS
2017/0283707 A1    10/2017 Gephart et al.

FOREIGN PATENT DOCUMENTS
CN    105349161 A    2/2016
CN    107934938 A    4/2018
(Continued)

OTHER PUBLICATIONS

Omoriyekomwan, et al., A review on the recent advances in the production of carbon nanotubes and carbon nanofibers via microwave-assisted pyrolysis of biomass, Fuel Processing Technology 2021; 214: 106686—pp. 1-22 (Year: 2021).*
(Continued)

*Primary Examiner* — Daniel C. McCracken
(74) *Attorney, Agent, or Firm* — MUNCY, GEISSLER, OLDS & LOWE, P.C.

(57) ABSTRACT

The present disclosure relates to a system and a method for preparing carbon nanofiber and hydrogen through continuous microwave pyrolysis. The system includes four apparatus. The melting and feeding apparatus is to heat and melt feedstocks. The microwave pyrolysis apparatus is for catalytic pyrolysis and includes a feedstock inlet, a gas outlet and a carbon outlet. The gas purification and utilization apparatus is for hydrogen purification and residual gas separation, The power generation apparatus includes a generator and a small internal combustion engine utilizing residual gas as fuel, and the generated smoke is conveyed to the melting and feeding apparatus for feedstocks melting. According to the present disclosure, a poly-generation system for co-producing high-performance carbon materials
(Continued)

and hydrogen through plastic wastes with greatly increased energy utilization rate is formed to solve the technical problems of low product yield and high energy consumption in traditional pyrolysis.

10 Claims, 1 Drawing Sheet

(51) Int. Cl.
 *C01B 3/26* (2006.01)
 *C01B 32/05* (2017.01)
(52) U.S. Cl.
 CPC ... *B01J 2219/1218* (2013.01); *C01P 2004/16* (2013.01); *C01P 2004/64* (2013.01)
(58) Field of Classification Search
 CPC ... C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 19/126; B01J 2219/1218; C01P 2004/16; C01P 2004/64; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133

See application file for complete search history.

(56) References Cited

FOREIGN PATENT DOCUMENTS

| | | | |
|---|---|---|---|
| CN | 108126705 | A | 6/2018 |
| CN | 108587671 | A | 9/2018 |
| CN | 109304201 | A | 2/2019 |
| CN | 111778046 | A | 10/2020 |
| CN | 111978967 | A | 11/2020 |
| CN | 111978971 | A | 11/2020 |
| CN | 113457575 | A | 10/2021 |
| JP | 2006-089344 | A | 4/2006 |

OTHER PUBLICATIONS

Zahid, et al., Synthesis of carbon nanomaterials from different pyrolysis techniques: a review, Mater. Res. Express 2018; 5: 052002—pp. 1-10 (Year: 2018).*

Mishra, et al., Pyrolysis of waste polypropylene for the synthesis of carbon nanotubes, Journal of Analytical and Applied Pyrolysis 2012; 94: 91-98 (Year: 2012).*

* cited by examiner

SYSTEM AND METHOD FOR PREPARING CARBON NANOFIBER AND HYDROGEN THROUGH CONTINUOUS MICROWAVE PYROLYSIS

TECHNICAL FIELD

The present disclosure relates to the technical field of pyrolysis, and particularly relates to a system and a method for preparing carbon nanofiber and hydrogen through continuous microwave pyrolysis.

BACKGROUND

More than 60% of waste plastics in the world are treated by an extensive incineration and landfill method, leading to the problems of water, gas and soil pollution and land occupation which are not able to be ignored. A carbon nanomaterial with higher performance is prepared under fine reaction regulation and control, and the carbon nanomaterial can be applied to the fuel cells, flexible materials, sensors and other high-tech industries to achieve high value-added utilization of the waste plastics. However, a traditional pyrolysis vapor deposition preparation method needs high reaction temperature and long deposition time, and has the bottleneck problems of low target product recovery rate, poor quality and high system energy consumption.

SUMMARY

The present disclosure provides a system and a method for preparing carbon nanofiber and hydrogen through continuous microwave pyrolysis, and solves the technical problems that a traditional pyrolysis method is low in product yield and high in energy consumption.

The technical solution adopted by the present disclosure is as follows:

A system for preparing carbon nanofiber and hydrogen through continuous microwave pyrolysis includes:
  a melting and feeding apparatus configured to heat and melt materials;
  a microwave pyrolysis apparatus which is configured to perform catalytic pyrolysis on the materials and includes a material inlet, a pyrolysis gas outlet and a carbon product outlet, the material inlet being connected with a material outlet of the melting and feeding apparatus;
  a pyrolysis gas purification and utilization apparatus which is connected with the pyrolysis gas outlet and is configured to carry out hydrogen purification and residual gas separation on pyrolysis gas generated by catalytic pyrolysis; and
  a power generation apparatus which includes a small internal combustion engine and a generator, the small internal combustion engine utilizing residual gas as fuel and conveying smoke generated by combustion to the melting and feeding apparatus to be used as a heat source for melting the materials.

According to the further technical solution,
  the system further includes a carbon product collecting apparatus; an inlet of the carbon product collecting apparatus is connected with the carbon product outlet, and the carbon product collecting apparatus is configured to recover solid materials pyrolyzed by the microwave pyrolysis apparatus; and air is heated through waste heat of the solid materials, and the heated air is supplied to the small internal combustion engine for auxiliary combustion.

The microwave pyrolysis apparatus structurally includes a roller, wherein microwave generation apparatuses are arranged in the roller, and a fixed shell which forms a cavity with an outer wall of the roller is arranged on an outer side of the roller; the material inlet and a wave absorbing catalyst inlet are formed in an upper portion of the fixed shell; and an upper end scraper assembly is arranged on an inner wall of the fixed shell and configured to guide the materials to wrap the rotating roller to form a material film and meanwhile guide a catalyst to wrap the material film to form a catalyst film.

The upper end scraper assembly structurally includes a front scraper and a rear scraper, wherein one end of the front scraper and one end of the rear scraper are connected to two sides of the wave absorbing catalyst inlet respectively to form a flow guide channel of the catalyst, and the other end of the front scraper and the other end of the rear scraper incline in a rotating direction of the roller and form a gap with an outer wall of the roller.

The carbon product outlet is formed in a lower portion of the fixed shell, a lower scraper is arranged at a position close to the carbon product outlet, one end of the lower scraper is connected with the fixed shell while the other end thereof abuts against an outer wall of the roller, and the lower scraper is configured to scrap pyrolyzed solid matters down from the outer wall of the roller.

The carbon product collecting apparatus includes an inner cylinder and an outer cylinder arranged outside the inner cylinder in a sleeving mode, and an air flow channel is formed between the outer cylinder and the inner cylinder; a hot air outlet is formed in one end of the outer cylinder and connected to the small internal combustion engine through an air-fuel ratio controller; and a spiral conveying structure is arranged in the inner cylinder, and an outlet in one end of the spiral conveying structure is connected to a carbon storage tank.

The pyrolysis gas purification and utilization apparatus structurally includes a hydrogen purification apparatus, wherein a pyrolysis gas inlet, an upper outlet configured to separate high-purity hydrogen and a lower outlet configured to separate residual pyrolysis gas are formed in the hydrogen purifying apparatus; the upper outlet is connected to a hydrogen storage tank; and the lower outlet is connected to the small internal combustion engine through the air-fuel ratio controller.

The melting and feeding apparatus structurally includes an inner cylinder and an outer cylinder arranged outside the inner cylinder in a sleeving mode, wherein a feeding port is formed in the inner cylinder, a smoke inlet is formed in the outer cylinder, and a smoke flowing channel is formed between the outer cylinder and the inner cylinder; and a spiral conveying mechanism is arranged in the inner cylinder.

A method for preparing carbon nanofiber and hydrogen through continuous microwave pyrolysis includes the following steps:
  feeding waste plastic raw materials into the melting and feeding apparatus for heating and melting, a needed heat source being provided in a high-temperature smoke indirect heat transfer mode;
  transferring the melted materials and a wave absorbing catalyst into the microwave pyrolysis apparatus for pyrolysis reaction: forming a double-layer material film through the materials and the wave absorbing catalyst and uniformly covering the roller in the microwave pyrolysis apparatus, the materials serving as an inner layer of the double-layer material film, an outer layer of the double-layer material film being a carbon-wrapped metal supported catalyst, and generating pyrolysis gas containing high-concentration hydrogen and three-dimensional carbon nanofiber through catalytic conversion in a limited range under the action of microwaves;

purifying the pyrolysis gas through the pyrolysis gas purification and utilization apparatus to obtain high-concentration hydrogen, and storing; feeding the residual pyrolysis gas into the small internal combustion engine for combusting to generate power, the generated electric energy being used for supplementing the energy requirement of the system, and charging the discharged high-temperature smoke into the melting and feeding apparatus to serve as a heat source for heating and melting; and conveying the three-dimensional carbon nanofiber to the carbon product collecting apparatus for collecting and utilizing, heating air by the carbon product collecting apparatus through the waste heat of the three-dimensional carbon nanofiber, supplying the heated air to the small internal combustion engine for auxiliary combustion, and conveying internal energy into mechanical energy through the small internal combustion engine and driving the generator to generate power so as to supplement the energy requirement of the system.

According to the further technical solution, the waste plastic raw materials are fed into the melting and feeding apparatus to be heated and melted, and the melting temperature ranges from 150° C. to 200° C.; the melted materials and the wave absorbing catalyst are fed into the microwave pyrolysis apparatus to be subjected to pyrolysis reaction, and the pyrolysis temperature ranges from 400° C. to 500° C.; the high-temperature smoke serves as the heat source, and the temperature of the high-temperature smoke ranges from 300° C. to 400° C.; and an inlet of the small internal combustion engine is connected to the air-fuel ratio controller, and an inlet of the air-fuel ratio controller is connected with an outlet of the carbon product collecting apparatus and an outlet of the pyrolysis gas purification and utilization apparatus; and the air-fuel ratio controller is configured to control the ratio of the heated air to the residual pyrolysis gas.

The present disclosure has the following beneficial effects.

According to the system for preparing the high-quality carbon nanofiber and the hydrogen through the waste plastics by continuous melting and feeding and microwave limited-range catalysis in the present disclosure, a polygeneration system for co-generating high-performance carbon materials and hydrogen through plastic wastes is formed, and the energy utilization rate is greatly increased.

According to the present disclosure, a method for efficiently and directionally converting plastics into the carbon nanofiber and hydrogen by utilizing the characteristic that plastics do not absorb wave, adding the wave absorbing catalyst and performing limited-range catalysis is provided. The wave absorbing catalyst is used for flash heat transfer to achieve limited-range heating and interface catalysis at the same time, multiple processes are coupled and integrated, the process is short, and the operation is easy.

The present disclosure provides a novel efficient carbon nanofiber wrapped nickel-iron composite oxide wave absorbing catalyst. The waste plastics can be rapidly converted at a low temperature. Compared with a traditional waste plastic vapor deposition process, the novel technology is low in reaction temperature, low in energy consumption, high in the yield of the carbon nanofiber, and high in purity and quality of hydrogen. Therefore, the overall economic efficiency is greatly improved.

In the figures: 1, melting and feeding apparatus; 2, feeding port; 3, motor; 4, upper end scraper assembly; 5, microwave pyrolysis apparatus; 6, roller; 7, microwave generation apparatus; 8, lower scraper; 9, catalyst inlet; 10, pyrolysis gas outlet; 11, centrifugal machine; 12, compressor; 13, hydrogen purification apparatus; 14, hydrogen storage tank; 15, air-fuel ratio controller; 16, small internal combustion engine; 17, generator; 18, vacuum pump; 19, carbon product collecting apparatus; 20, carbon storage tank; 21, front scraper; 22, rear scraper; 23, wave feed port; 24, waveguide; and 25, aluminum oxide substrate.

DETAILED DESCRIPTION

Specific implementations of the present disclosure will be described with reference to the accompanying drawings.

Figure 1:
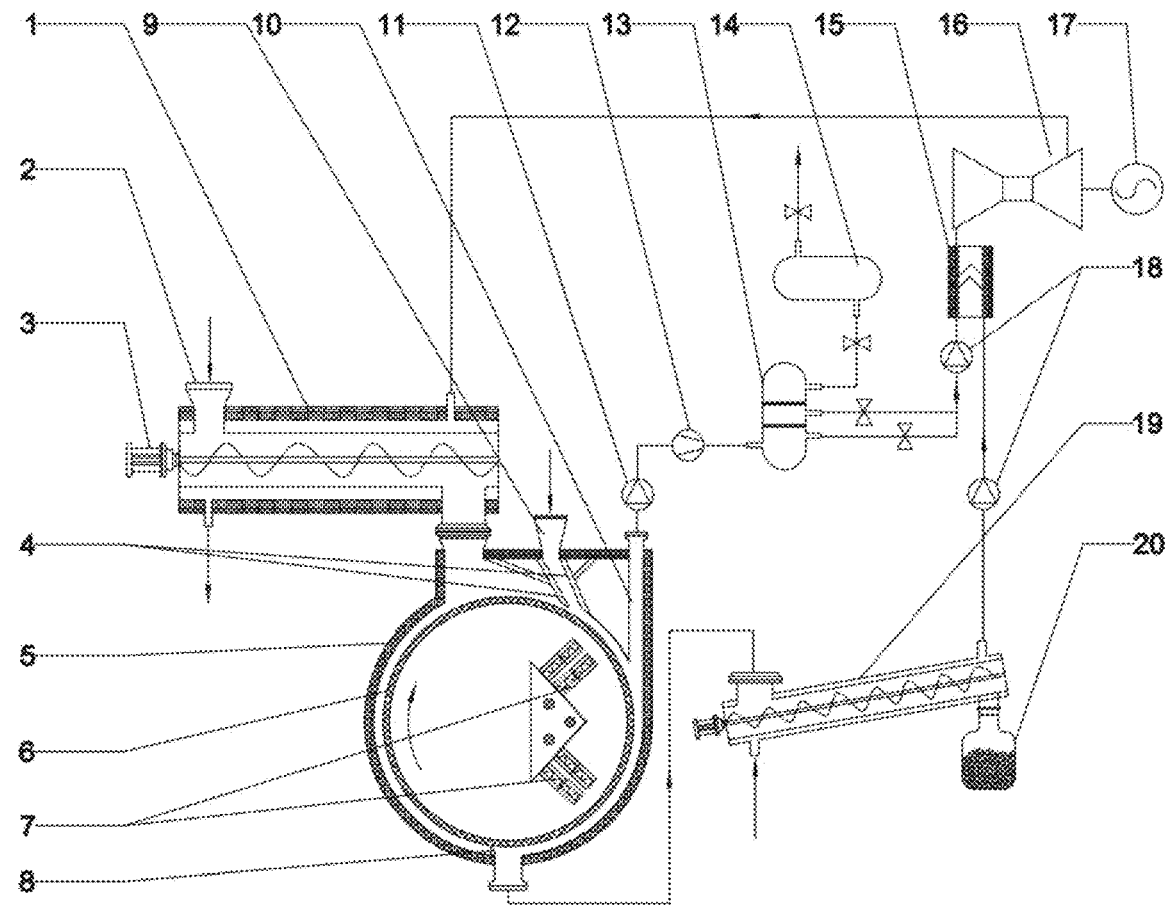
FIG. 1 is a structure schematic diagram of a system of a specific embodiment of the present disclosure.

As shown in FIG. 1, a system for preparing carbon nanofiber and hydrogen through continuous microwave pyrolysis in the embodiment includes:

a melting and feeding apparatus 1 configured to heat and melt materials;

a microwave pyrolysis apparatus 5 which is configured to perform catalytic pyrolysis on the materials and includes a material inlet, a pyrolysis gas outlet 10 and a carbon product outlet, the material inlet being connected with a material outlet of the melting and feeding apparatus 1;

a pyrolysis gas purification and utilization apparatus which is connected with the pyrolysis gas outlet 10 and is configured to carry out hydrogen purification and residual gas separation on pyrolysis gas generated by catalytic pyrolysis; and a power generation apparatus which includes a small internal combustion engine 16 and a generator 17, the small internal combustion engine 16 utilizing residual gas as fuel and conveying smoke generated by combustion to the melting and feeding apparatus 1 to be used as a heat source for melting the materials.

The system further includes a carbon product collecting apparatus 19, wherein an inlet is connected with the carbon product outlet of the microwave pyrolysis apparatus 5, and the carbon product collecting apparatus is configured to recover solid materials pyrolyzed by the microwave pyrolysis apparatus 5; and air is heated through waste heat of the solid materials, and the heated air is supplied to the small internal combustion engine 16 for auxiliary combustion.

The melting and feeding apparatus 1 structurally includes an inner cylinder and an outer cylinder arranged outside the inner cylinder in a sleeving mode; a feeding port 2 is formed in the inner cylinder, a smoke inlet connected with a smoke outlet of the small internal combustion engine 16 is formed in the outer cylinder, and a smoke flowing channel is formed between the outer cylinder and the inner cylinder; a spiral conveying mechanism is arranged in the inner cylinder and specifically adopts a spiral auger, and one end of the spiral conveying mechanism is driven by a motor 3. The melting and feeding apparatus 1 is of a double-layer cylinder (pipe) structure, high-temperature smoke flows outside the melting and feeding apparatus, and materials are conveyed inside the melting and feeding apparatus, and heat is indirectly transferred between plastic and the smoke through a cylinder wall.

The microwave pyrolysis apparatus 5 structurally includes a roller 6, wherein microwave generation apparatuses 7 is arranged in the roller 6, a fixed shell which forms a cavity with an outer wall of the roller 6 is arranged on an outer side of the roller; the material inlet and a wave absorbing catalyst inlet 9 are formed in an upper portion of the fixed shell, and a carbon product outlet is formed in a lower portion of the fixed shell; and an upper end scraper assembly 4 is arranged on an inner wall of the fixed shell and configured to guide the materials to wrap the rotating roller 6 to form a material film and meanwhile guide a catalyst to wrap the material film to form a catalyst film. A lower scraper 8 is arranged at a position, close to the carbon product outlet, at the lower portion of the fixed shell; one end of the lower scraper is connected with the fixed shell while the other end thereof abuts against an outer wall of the roller 6; and the lower scraper is configured to scrap pyrolyzed solid matters down from the outer wall of the roller 6.

Figure 2:
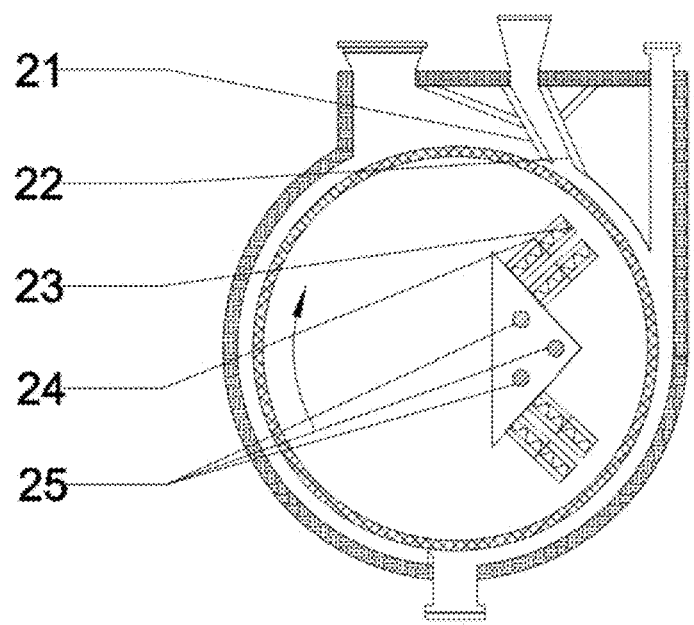
FIG. 2 is a structure schematic diagram of a microwave pyrolysis plant of a specific embodiment of the present disclosure.

As shown in FIG. 2, the upper end scraper assembly 4 structurally includes a front scraper 21 and a rear scraper 22, one end of the front scraper 21 and one end of the rear scraper 22 are connected to the two sides of the wave absorbing catalyst inlet 9 respectively to form a flow guide channel of the catalyst, and the other end of the front scraper 21 and the other end of the rear scraper 22 incline in a rotating direction of the roller 6 and form a gap with the outer wall of the roller 6.

The roller 6 is preferably made of a high-temperature ceramic material, including but not limited to one or more of aluminum oxide and boride, carbide and nitride of transition metal (zirconium, tantalum and titanium). The microwave generation apparatuses 7 are fixed to an axis position in the roller 6. The microwave generation apparatuses 7 structurally include aluminum oxide substrates 25 for fixing and supporting, and waveguides 24 and wave feed ports 23 are formed in the aluminum oxide substrates.

As shown in FIG. 2, melted materials are fed through the material inlet in the fixed shell of the microwave pyrolysis apparatus 5. The roller 6 keeps rotating during working, the rotating direction is shown as an arrow direction in FIG. 2. Melted waste plastics are conveyed to the front scraper 21 in the upper end scraper assembly 4 under the action of the high-temperature ceramic roller 6, the melted waste plastics are attached to the outer wall of the roller 6 under the pressing action of the front scraper 21, thus forming a uniform material film with low thickness. Similarly, a wave absorbing catalyst is fed through the catalyst inlet 9, a surface of the material film is uniformly coated with the wave absorbing catalyst through the rear scraper 22. Full conversion of raw materials is guaranteed through the microwave generation apparatuses 7 which are symmetrically arranged about the axis.

The carbon product outlet is connected to the carbon product collecting apparatus 19, a pyrolysis gas outlet is connected to the pyrolysis gas purification and utilization system, the carbon product collecting apparatus 19 is in a double-layer pipe (cylinder) shape and includes an inner cylinder and an outer cylinder arranged outside the inner cylinder in a sleeving mode, and an air flow channel is formed between the outer cylinder and the inner cylinder; a hot air outlet is formed in one end of the outer cylinder and connected to the small internal combustion engine 16 through an air-fuel ratio controller 15; a cold air intake vent is formed in the other end of the outer cylinder; and a spiral conveying structure is arranged in the inner cylinder, and an outlet in one end of the spiral conveying structure is connected with a carbon storage tank 20.

A spiral auger driven by the motor is arranged at a central axis of the inner cylinder, preferably, cold air obtained after heat exchange enters the air-fuel ratio controller 15, and therefore the heat transfer end difference is reduced so as to reduce energy consumption.

As shown in FIG. 1, the pyrolysis gas purification and utilization apparatus structurally includes a hydrogen purification apparatus 13; a pyrolysis gas inlet, an upper outlet configured to separate high-purity hydrogen and a lower outlet configured to separate residual pyrolysis gas are formed in the hydrogen purification apparatus 13; and the upper outlet is connected to a hydrogen storage tank 14, and the lower outlet is connected to the small internal combustion engine 16 through the air-fuel ratio controller 15.

The pyrolysis gas inlet of the hydrogen purification apparatus 13 is connected with the pyrolysis gas outlet 10 of the microwave pyrolysis apparatus 5, and a centrifugal machine 11 and a compressor 12 are connected to a connecting pipeline. Preferably, the hydrogen purification apparatus 13 is provided with an upper outlet, a middle outlet and a lower outlet, the uppermost outlet is a separated high-purity hydrogen outlet and the uppermost outlet is connected to the hydrogen storage tank 14; the middle outlet and the lower outlet are configured to discharge residual pyrolysis gas into the air-fuel ratio controller 15; vacuum pumps 18 are arranged on an exhaust pipeline; and the compressor 12 and the vacuum pumps 18 guarantee the hydrogen separation and purification effect.

Two inlets of the air-fuel ratio controller 15 are connected with a residual pyrolysis gas outlet and an air outlet which is subjected to heat exchange through an outer layer of the carbon product collecting apparatus 19 correspondingly. The air-fuel ratio controller 15 is connected with the small internal combustion engine 16 in series and configured to control the ratio of the heated air to the residual pyrolysis gas. The small internal combustion engine 16 pushes the generator 17 coaxially connected with the small internal combustion engine to generate power through fuel gas heat energy.

The cheap carbon-wrapped metal supported catalyst is preferably adopted as the wave absorbing catalyst, and the wave absorbing catalyst is prepared by mixing a carbon-based material with a cheap transition metal salt alcoholic solution, drying and then annealing at a high temperature in a reducing atmosphere. Preferably, the carbon-based material includes but is not limited to one or more of melamine, biomass, waste plastics, graphite carbon and carbon nanofiber; the cheap transition metal includes but is not limited to one or more of iron, copper and nickel; the reducing atmosphere includes but is not limited to one or more of nitrogen, hydrogen and argon; and the annealing temperature ranges from 600° C. to 900° C.

Preferably, heat preservation layers are arranged outside the melting and feeding apparatus 1, the microwave pyrolysis apparatus 5 and the carbon product collecting apparatus 19.

A method for preparing carbon nanofiber and hydrogen through continuous microwave pyrolysis in the embodiment includes the following steps:

feeding waste plastic raw materials into the melting and feeding apparatus 1 for heating and melting, a needed heat source being provided in a high-temperature smoke indirect heat transfer mode, the melting temperature ranging from 150° C. to 200° C.;

transferring the melted materials and the wave absorbing catalyst into the microwave pyrolysis apparatus 5 for pyrolysis reaction: forming a double-layer material film through the materials and the wave absorbing catalyst and uniformly covering the roller 6 in the microwave pyrolysis apparatus 5, the materials serving as an inner layer of the double-layer material film, a carbon-wrapped metal supported catalyst serving as an outer layer of the double-layer material film, and generating pyrolysis gas containing high-concentration hydrogen and three-dimensional carbon nanofiber through catalytic conversion in a limited range under the action of microwaves, the pyrolysis temperature ranging from 400° C. to 500° C., the yield of carbon nanofiber produced being about 40 wt %, and the concentration of hydrogen in noncondensable gas being about 70%;

purifying the pyrolysis gas through the pyrolysis gas purification and utilization apparatus to obtain high-concentration hydrogen, and storing; feeding the residual pyrolysis gas into the small internal combustion engine 16 for combusting to generate power, the generated electric energy being used for supplementing the energy requirement of the system, and charging the discharged high-temperature smoke into the melting and feeding apparatus 1 to serve as a heat source for heating and melting, the temperature of the high-temperature smoke ranging from 300° C. to 400° C.;

conveying the three-dimensional carbon nanofiber to the carbon product collecting apparatus 19 for collecting and utilizing, heating air by the carbon product collecting apparatus 19 through the waste heat of the three-dimensional carbon nanofiber, supplying the heated air to the small internal combustion engine 16 for auxiliary combustion, and conveying internal energy into mechanical energy through the small internal combustion engine 16 and driving the generator 17 to generate power so as to supplement the energy requirement of the system.

The carbon product collecting apparatus 19 is cooled in an air cooling mode, and the discharge temperature after cooling is 50° C. to 100° C. A spiral melting and continuous feeding coupling microwave pyrolysis integrated preparation process is constructed in the present disclosure, the waste plastics are melted by the high-temperature smoke, the melted raw materials are subjected to limited-range catalytic conversion through the cheap carbon-wrapped metal supported catalyst under microwaves, the carbon nanofiber are efficiently prepared and the high-concentration hydrogen is co-produced, and thus high-value recycling of the waste plastics is realized. A novel cheap metal supported carbon-based catalyst with high wave absorption capacity and excellent catalytic performance is provided in the present disclosure and is uniformly added into the waste plastics, so that multi-process coupling integration of microwave limited-range heating and interface catalytic pyrolysis deposition is realized, and low-temperature, short-time and high-yield preparation of the carbon nanofiber and co-production of the high-concentration hydrogen are realized.

What is claimed is:

1. A system for preparing carbon nanofiber and hydrogen through continuous microwave pyrolysis, comprising:

a melting and feeding apparatus configured to heat and melt materials;

a microwave pyrolysis apparatus which is configured to perform catalytic pyrolysis on the materials and comprises a material inlet, a pyrolysis gas outlet and a carbon product outlet, the material inlet being connected with a material outlet of the melting and feeding apparatus, the microwave pyrolysis apparatus further comprising a roller, microwave generation apparatuses being arranged in the roller, a fixed shell which forms a cavity with an outer wall of the roller being arranged on an outer side of the roller, the material inlet and a wave absorbing catalyst inlet being formed in an upper portion of the fixed shell, the carbon product outlet being formed in a lower portion of the fixed shell, and an upper end scraper assembly being arranged on an inner wall of the fixed shell and configured to guide the materials to wrap the rotating roller to form a material film and meanwhile guide a catalyst to wrap the material film to form a catalyst film;

a pyrolysis gas purification and utilization apparatus which is connected with the pyrolysis gas outlet and is configured to carry out hydrogen purification and residual gas separation on pyrolysis gas generated by catalytic pyrolysis;

a power generation apparatus which comprises a small internal combustion engine and a generator, the small internal combustion engine utilizing residual gas as fuel and conveying smoke generated by combustion to the melting and feeding apparatus to be used as a heat source for melting the materials; and a carbon product collecting apparatus, an inlet of the carbon product collecting apparatus being connected with the carbon product outlet, the carbon product collecting apparatus being configured to recover solid materials pyrolyzed by the microwave pyrolysis apparatus, air being heated through waste heat of the solid materials, and the heated air being supplied to the small internal combustion engine for auxiliary combustion.

2. The system for preparing the carbon nanofiber and the hydrogen through continuous microwave pyrolysis according to claim 1, wherein the upper end scraper assembly structurally comprises a front scraper and a rear scraper, one end of the front scraper and one end of the rear scraper are connected to the two sides of the wave absorbing catalyst inlet respectively to form a flow guide channel of the catalyst, and the other end of the front scraper and the other end of the rear scraper incline in a rotating direction of the roller and form a gap with the outer wall of the roller.

3. The system for preparing the carbon nanofiber and the hydrogen through continuous microwave pyrolysis according to claim 1, wherein the carbon product a lower scraper is arranged at a position close to the carbon product outlet, at the lower portion of the fixed shell, and one end of the lower scraper is connected with the fixed shell while the other end thereof abuts against an outer wall of the roller; and the lower scraper is configured to scrap pyrolyzed solid matters down from the outer wall of the roller.

4. The system for preparing the carbon nanofiber and the hydrogen through continuous microwave pyrolysis according to claim 1, wherein the carbon product collecting apparatus comprises an inner cylinder and an outer cylinder arranged outside the inner cylinder in a sleeving mode, and an air flow channel is formed between the outer cylinder and the inner cylinder; a hot air outlet is formed in one end of the outer cylinder and connected to the small internal combustion engine through an air-fuel ratio controller; and a spiral conveying structure is arranged in the inner cylinder, and an outlet in one end of the spiral conveying structure is connected with a carbon storage tank.

5. The system for preparing the carbon nanofiber and the hydrogen through continuous microwave pyrolysis according to claim 1, wherein the pyrolysis gas purification and utilization apparatus structurally comprises a hydrogen purification apparatus; a pyrolysis gas inlet, an upper outlet configured to separate high-purity hydrogen and a lower outlet configured to separate residual pyrolysis gas are formed in the hydrogen purification apparatus; and the upper outlet is connected to a hydrogen storage tank, and the lower outlet is connected to the small internal combustion engine through the air-fuel ratio controller.

6. The system for preparing the carbon nanofiber and the hydrogen through continuous microwave pyrolysis according to claim 1, wherein the melting and feeding apparatus structurally comprises an inner cylinder and an outer cylinder arranged outside the inner cylinder in a sleeving mode; a feeding port is formed in the inner cylinder, a smoke inlet is formed in the outer cylinder, and a smoke flowing channel is formed between the outer cylinder and the inner cylinder; and a spiral conveying mechanism is arranged in the inner cylinder.

7. A method for preparing carbon nanofiber and hydrogen through continuous microwave pyrolysis based on the system for preparing the carbon nanofiber and the hydrogen through continuous microwave pyrolysis according to claim 1, comprising the following steps:
  feeding waste plastic raw materials into the melting and feeding apparatus for heating and melting, a needed heat source being provided in a high-temperature smoke indirect heat transfer mode;
  transferring the melted materials and a wave absorbing catalyst into the microwave pyrolysis apparatus for pyrolysis reaction;
  forming a double-layer material film through the materials and the wave absorbing catalyst and uniformly covering the roller in the microwave pyrolysis apparatus, the materials serving as an inner layer of the double-layer material film, a carbon-wrapped metal supported catalyst serving as an outer layer of the double-layer material film, and generating pyrolysis gas containing high-concentration hydrogen and three-dimensional carbon nanofiber through catalytic conversion in a limited range under the action of microwaves;
  purifying the pyrolysis gas through the pyrolysis gas purification and utilization apparatus to obtain high-concentration hydrogen, and storing; feeding the residual pyrolysis gas into the small internal combustion engine for combusting to generate power, the generated electric energy being used for supplementing the energy requirement of the system, and charging the discharged high-temperature smoke into the melting and feeding apparatus to serve as a heat source for heating and melting; and
  conveying the three-dimensional carbon nanofiber to the carbon product collecting apparatus for collecting and utilizing, heating air by the carbon product collecting apparatus through the waste heat of the three-dimensional carbon nanofiber, supplying the heated air to the small internal combustion engine for auxiliary combustion, and conveying internal energy into mechanical energy through the small internal combustion engine and driving the generator to generate power so as to supplement the energy requirement of the system.

8. The method for preparing the carbon nanofiber and the hydrogen through continuous microwave pyrolysis according to claim 7, wherein the waste plastic raw materials are fed into the melting and feeding apparatus to be heated and melted, and the melting temperature ranges from 150° C. to 200° C.; the melted materials and the wave absorbing catalyst are fed into the microwave pyrolysis apparatus to be subjected to pyrolysis reaction, and the pyrolysis temperature ranges from 400° C. to 500° C.; and high-temperature smoke serves as the heat source, and the temperature of the high-temperature smoke ranges from 300° C. to 400° C.; and
  an inlet of the small internal combustion engine is connected to the air-fuel ratio controller, and an inlet of the air-fuel ratio controller is connected with an outlet of the carbon product collecting apparatus and an outlet of the pyrolysis gas purification and utilization apparatus; and the air-fuel ratio controller is configured to control the ratio of the heated air to the residual pyrolysis gas.

9. The method for preparing the carbon nanofiber and the hydrogen through continuous microwave pyrolysis according to claim 7, wherein the wave absorbing agent is a cheap carbon-wrapped metal supported catalyst, and the wave absorbing catalyst is prepared by mixing a carbon-based material with a cheap transition metal salt alcoholic solution, drying and then annealing at a high temperature in a reducing atmosphere.

10. The method for preparing the carbon nanofiber and the hydrogen through continuous microwave pyrolysis according to claim 9, wherein the carbon-based material is one or more of melamine, biomass, waste plastics, graphite carbon and carbon nanofiber; and the annealing temperature ranges from 600° C. to 900° C.

* * * * *